June 9, 1931.  W. P. STRONG  1,809,606
VEHICLE FRAME
Filed Aug. 16 1928   3 Sheets-Sheet 3
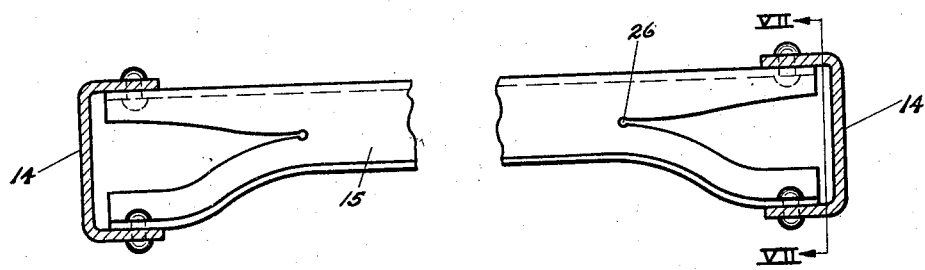
Fig. VI.
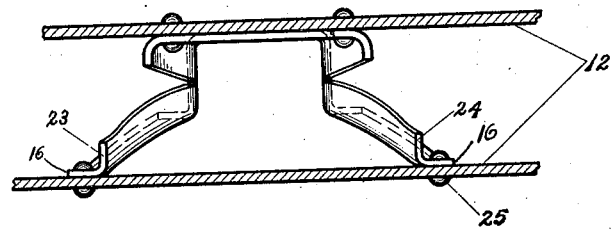
Fig. VII.
INVENTOR.
WILLIAM P. STRONG
BY
ATTORNEY.

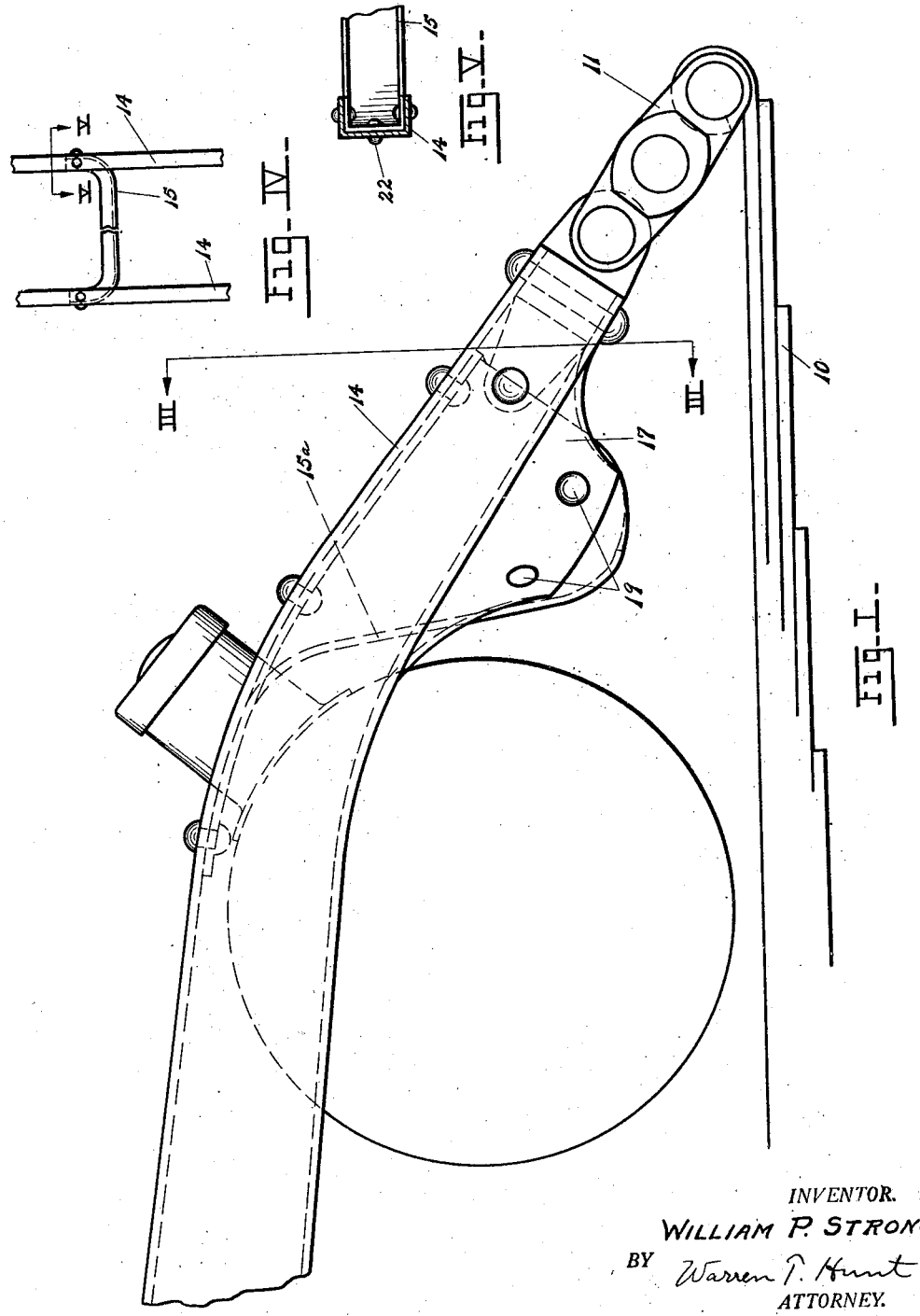

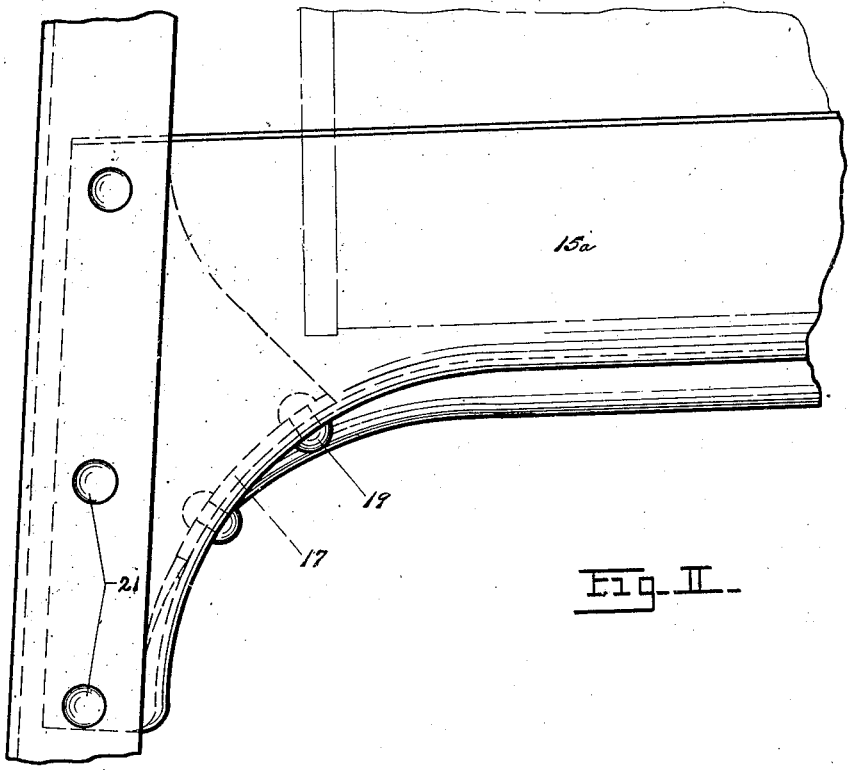
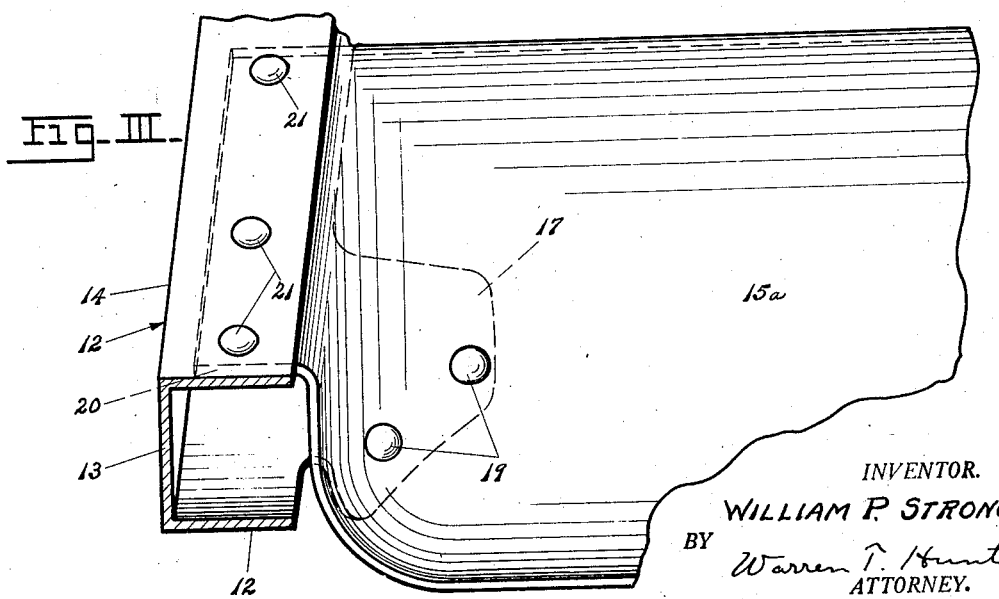

Patented June 9, 1931

1,809,606

UNITED STATES PATENT OFFICE

WILLIAM P. STRONG, OF TOLEDO, OHIO, ASSIGNOR TO THE WILLYS-OVERLAND COMPANY, OF TOLEDO, OHIO, A CORPORATION OF OHIO

VEHICLE FRAME

Application filed August 16, 1928. Serial No. 300,066.

My invention relates to frame structures and it has particular application to vehicle frames, such as are commonly employed in automobiles.

The object of the invention is to simplify the manner of connecting the several rigid members comprising the frame structure as well as to provide a frame in which the forces are more evenly distributed than heretofore, thereby preventing their localization.

It is a further object of the invention to reduce the cost of labor involved in producing the parts making up a frame and assembling the same. As an ancillary object the invention contemplates reducing the number of parts which have been found necessary heretofore and particularly to obviate the necessity of angle braces.

Another object of the invention is to reduce the scrap and trimmings incident to the manufacture of the frame pieces and to utilize the surplus for the purpose of facilitating and simplifying the joint between the several frame members.

These, together with other objects will become more apparent from a consideration of the drawings and description of embodiments, which may be preferred, of the invention hereinafter set forth.

Figure I is a side view of a portion of a vehicle frame, embodying one form of my invention.

Fig. II is a segmental plan view of a portion of the structure illustrated in Figure I.

Fig. III is a sectional view of the structure illustrated in Fig. I, taken along line III—III.

Fig. IV is a plan view of the frame, embodying a modification of the principles illustrated in the first three views.

Fig. V is a sectional view of the portion of the frame illustrated in Fig. IV and taken along the line V—V.

Fig. VI is a side view partly broken of a cross member of modified form and illustrates the manner of securing the same to the longitudinal members; and Fig. VII is an end view of the structure illustrated in Fig. VI, and taken along the line VII—VII.

In the drawings only a portion of an automobile chassis is illustrated, which includes a leaf spring 10 on which is supported a fabricated pressed steel frame that is secured to the spring by means of shackles 11. The principal elements of the frame are formed of channel irons, having two flanges 12 which are formed integrally with a web portion 13, substantially as illustrated in Fig. III.

The frame is made up of two longitudinal members 14 running the full length of the car and several cross members 15. Generally the longitudinal members have a channelled cross section and are of irregular dimensions. Thus, the mid-portion of each longitudinal member has a relatively deep web and its flanges are comparatively long, whereas the ends have a cross section with relatively narrow web and short flanges. By reason of the fact that stock from which the horizontal members are made is of uniform dimensions, the surplus material which is trimmed off is disposed of as scrap.

In practicing the present invention the cross members may be secured to the longitudinal members without employing additional material. Thus, near the rear ends of the longitudinal members an ear 17 is provided as an integral portion of the flange 12 and is formed of material which would normally be sheared from the channel member. The ear so formed is shaped in a plane intersecting the plane of the flange 12 and otherwise adapted to engage a rear cross member 15a having a plain mid-section and ends which are turned through substantially 90 degrees and in parallel alignment with the longitudinal members. The engaging surfaces are secured together by means of rivets 19.

The cross sectional configuration of the cross member may be of any type desired. In the present instance it is of a curvalinear character in order to protect the gasoline tank which is suspended from the frame, adjacent the cross member. It is to be noted that the construction affords a secure joint between the cross member and the longitudinal members without employing re-enforcing plates. Moreover, the ear which engages the cross member is formed of material which would normally be trimmed off and, therefore, would perform no useful function.

When desired, the extremities of the upper portion of the cross member may be bent horizontally as illustrated at 20 and brought into engagement with the upper flange of the longitudinal member, where it is secured by means of rivets 21. Such construction affords greater security without additional material.

In the mid-section of the longitudinal members where no substantial excess of material is present to form ears or attaching lugs such as has been described heretofore, the cross member 15 may be secured to the longitudinal members 14 in the manner illustrated in Figs. IV to VII, inclusive. The first two figures illustrate an embodiment wherein the cross member is of channel section; the ends are turned through substantially 90 degrees and are secured to the web and flanges of the longitudinal member by rivets 22. In Figs. VI and VII the cross member is of a modified channelled section in which the edges of the flanges 16 are bent outwardly substantially 90 degrees. The cross member is cut horizontally through the symmetrical flanged portions. The right angle members 23 and 24 so formed are spread horizontally, as well as vertically, in order to distribute the load which they transmit to the horizontal member more uniformly, as well as to overcome the differences in width of the web of the longitudinal and cross members. In Fig. VII the symmetrical right-angle members 24 are spread and secured to the flange of the longitudinal member by rivets 25. The web portion of the cross member is similarly secured to the upper flange of the longitudinal member.

In order to avoid localization of stress, by reason of the slit or cut, the cut terminates in a small hole 26 which functions to distribute the strain at this point. It is to be understood, of course, that the manner of cutting the ends of the cross member is not limited to that herein disclosed, but may be extended to include embodiments wherein the web portion alone is cut. Similarly, cross members having other cross sectional configurations may be employed, the ends in each instance, being cut in order to engage the opposite flanges and distribute the load more evenly, as is herein described.

While the principles of the invention have been illustrated and described as they apply to the several embodiments, it will be apparent to those skilled in the art that other modifications may be constructed without departing from the scope of the present invention, and I desire, therefore, that it be limited only as indicated in the appended claims.

I claim:

1. In a vehicle frame, the combination of two longitudinal channel members each comprising a vertical web and parallel horizontal flanged portions, a vertically inclined ear formed integrally with the lower flanged portion adjacent the extremity of each longitudinal member, a cross member interconnecting the longitudinal members having its ends turned substantially ninety degrees into engagement with the ears, the upper edge of the cross member adjoining the ears being flanged horizontally to engage the upper flange of the channel, and means for securing the horizontal member to the cross member at points of engagement.

2. In a vehicle frame the combination of two longitudinal channel members each including a horizontal flange, a vertically inclined ear formed integrally with each channel member below the flange, a transverse member having its ends formed to engage the ears adapted to interconnect the channel members and provided with laterally flanged end portions formed to engage the upper flanges of the channel, and means for interconnecting the members at points of engagement.

3. In a vehicle frame the combination of a pair of U-shaped longitudinal channel members each including a horizontal flange, a vertically inclined ear formed integrally with each channel member and projecting downwardly therefrom, a transverse member interconnecting the channel members having its ends formed to engage the ears and the horizontal flanges, and means for interconnecting the members at points of engagement.

4. In a vehicle frame, the combination of a pair of longitudinal members, each including a horizontal flange, an ear formed integrally with each member, said ear being spaced with respect to the flange, a transverse member having its ends formed to engage the ears and interconnecting the longitudinal members, said transverse member being adapted to engage the flange of the horizontal member, and means interconnecting the transverse member with the longitudinal member at points of engagement.

5. In a vehicle frame, the combination of a pair of longitudinal members, each embodying a horizontal flanged portion, an ear formed integrally with the longitudinal member spaced with respect to the flange and positioned in a plane which intersects the plane of the flange, a cross member having its ends formed to engage the ears and adapted to interconnect said longitudinal members, and means for rigidly securing the members together at points of engagement.

6. A vehicle frame including a pair of longitudinal U-shaped channel members each having a pair of inturned horizontal flanges, a channel cross member therebetween having its ends split and spread, one split portion being secured to the upper flange of the cross member and the other split portion being secured to the lower flange, one of said split portions comprising a pair of spaced legs.

7. A frame for a vehicle including a pair of longitudinal U-shaped channel members having a web portion formed integrally with a pair of inturned horizontal flanges, a channelled U-shaped cross member maintaining the position of the longitudinal members having its ends cut transversely of the cross member and spread, whereby the base of the U engages one of the flanges and the sides of the U engage the other of the flanges, and means for securing the flanges to the cross member.

8. In a frame for a vehicle, a pair of longitudinal channelled members having a web portion formed integrally with a pair of inturned horizontal flanges and one or more channelled U-shaped cross members for maintaining the position of the longitudinal members each cross member having its ends cut transversely of the cross members terminating in an aperture and spread, the spread portions forming the base of the U engaging one of the flanges and the other spread portion engaging the other of the flanges, and means for securing the engaging flanges and spread portions together.

9. A structural U-shaped channelled member having a web and flange portions, said member being split transversely of the U, the split portions toward the open end of the U being spread out of alignment with the corresponding portions adjoining the base of the U.

10. A structural U-shaped steel member adapted to be fabricated into a frame having at least one of its ends bifurcated by cutting the channel transversely of the U, the resulting segments thereof being spread for the purpose herein set forth.

11. A vehicle frame, including a pair of longitudinal channel members each having a web portion and horizontal flanges, the web portion of each member being narrower near one of the ends thereof than in the intermediate portion and one of said flanges of each member at said end being provided with an integral ear, a cross member having its ends secured to said flanges intermediate the ends of said channel members, and an end cross member having its ends secured to said ears.

12. A vehicle frame including a pair of longitudinal channelled members each having a web portion and horizontal flanges, the webs of said members being substantially wider at the intermediate portion of said frame than at one of the ends, an intermediate U-shaped cross member having its ends transversely split and spread, the split portions of said ends being secured to the flanges of said channel members adjacent the wide web, and a cross member at said one end of the frame having its ends secured to the flanges of said channel members.

In testimony whereof I affix my signature.

WILLIAM P. STRONG.